United States Patent
Katagiyama et al.

(10) Patent No.: US 8,297,853 B2
(45) Date of Patent: Oct. 30, 2012

(54) OPTICAL CONNECTOR DEVICE

(75) Inventors: Naoki Katagiyama, Tokyo (JP); Hideto Shimazu, Tokyo (JP); Takeo Toda, Tokyo (JP); Yasutaka Hiroki, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 262 days.

(21) Appl. No.: 12/800,545

(22) Filed: May 18, 2010

(65) Prior Publication Data

US 2010/0303417 A1 Dec. 2, 2010

(30) Foreign Application Priority Data

Jun. 2, 2009 (JP) .................................. 2009-133530

(51) Int. Cl.
*G02B 6/38* (2006.01)
(52) U.S. Cl. ................ 385/75; 385/58; 385/60; 385/72; 385/78
(58) Field of Classification Search .................... 385/58, 385/60, 72, 75, 78
See application file for complete search history.

(56) References Cited

U.S. PATENT DOCUMENTS

| | | | | |
|---|---|---|---|---|
| 6,039,585 A * | 3/2000 | Kim et al. | ...................... | 439/137 |
| 6,302,592 B1 * | 10/2001 | Zullig | .............................. | 385/60 |
| 6,652,152 B2 * | 11/2003 | Yang et al. | ....................... | 385/53 |
| 6,685,362 B2 * | 2/2004 | Burkholder et al. | ............ | 385/78 |
| 6,866,424 B2 | 3/2005 | Tanaka et al. | | |
| 6,869,297 B2 | 3/2005 | Caveney | | |
| 7,559,700 B2 | 7/2009 | Eguchi et al. | | |

FOREIGN PATENT DOCUMENTS

| | | |
|---|---|---|
| JP | 9-211264 | 8/1997 |
| JP | 2002-243978 | 8/2002 |
| JP | 2004-177417 | 6/2004 |
| JP | 2004-228079 | 8/2004 |
| JP | 2004-240162 | 8/2004 |
| JP | 2008-176297 | 7/2008 |

OTHER PUBLICATIONS

Japanese Office Action dated Mar. 1, 2012 in JP 2011-067220, along with an English translation of same.
Japanese Office Action dated Jan. 27, 2011 along with an English translation of same.

* cited by examiner

*Primary Examiner* — Daniel Petkovsek
(74) *Attorney, Agent, or Firm* — Collard & Roe, P.C.

(57) ABSTRACT

An optical connector device has a first connector including a ferrule for holding an optical fiber and a guide portion projecting longer than the ferrule. The optical connector device also has a second connector for receiving an end of the ferrule along an optical axis of the optical fiber. The second connector includes a receiver for receiving the guide portion and a shutter having a cover part. The shutter is movable between a cover position at which the optical axis intersects the cover part and an open position at which the optical axis does not intersect the cover part. The guide portion is operable to move the shutter from the cover position to the open position when the guide portion is received into the receiver.

5 Claims, 6 Drawing Sheets

OPTICAL CONNECTOR DEVICE

CROSS REFERENCE TO RELATED APPLICATIONS

Applicants claim priority under 35 U.S.C. §119 of Japanese Patent Application No. JP2009-133530 filed Jun. 2, 2009.

BACKGROUND OF THE INVENTION

The present invention relates to an optical connector device having two optical connectors, and more particularly to an optical connector device having a shutter and a switch mechanism for the shutter.

For example, an optical connector device having a shutter and a switch mechanism for the shutter is disclosed in JP-A 2004-177417, JP-A 2002-243978, and JP-A 9-211264.

The optical connector device disclosed in those references has two types of optical connectors including a first optical connector with a shutter and a second optical connector matable with the first optical connector. In the disclosed optical connector device, when the first connector is mated with the second connector, the shutter is pushed down and thus opened by a housing of the first connector. From the viewpoint of the structure of the shutter, a portion of the housing of the first connector that is located near a ferrule of the first connector is used to push the shutter.

As described above, since the portion of the housing of the first connector that is located near the ferrule is used to push and open the shutter in the disclosed optical connector device, the ferrule may be brought into contact with the shutter so that an end surface of the ferrule is damaged.

SUMMARY OF THE INVENTION

It is, therefore, an object of the present invention to provide an optical connector device with improvement in a shutter and a switch mechanism for the shutter so as to prevent the shutter from being brought into contact with an end surface of a ferrule when the shutter is opened and closed.

One aspect of the present invention provides an optical connector device having a first connector including a ferrule for holding an optical fiber and a guide portion projecting longer than the ferrule. The optical connector device also has a second connector for receiving an end of the ferrule along an optical axis of the optical fiber. The second connector includes a receiver for receiving the guide portion and a shutter having a cover part. The shutter is movable between a cover position at which the optical axis intersects the cover part and an open position at which the optical axis does not intersect the cover part. The guide portion is operable to move the shutter from the cover position to the open position when the guide portion is received into the receiver.

An appreciation of the objectives of the present invention and a more complete understanding of its structure may be had by studying the following description of the preferred embodiment and by referring to the accompanying drawings.

Figure 1:
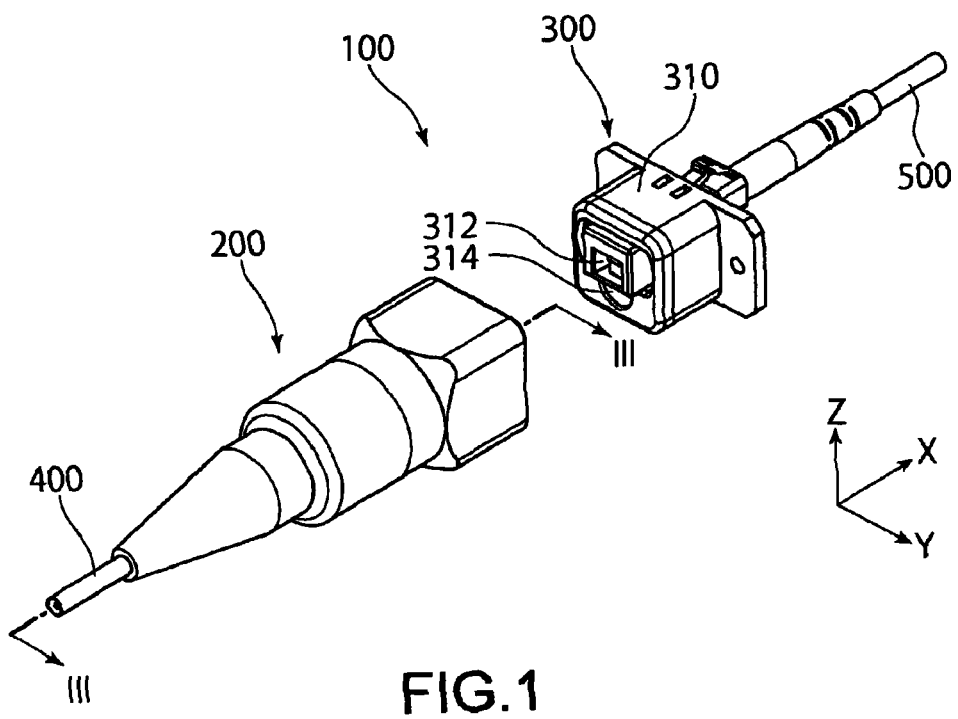
FIG. 1 is a perspective view showing an optical connector device having a first connector and a second connector according to an embodiment of the present invention, in which the first connector and the second connector are separated from each other.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DESCRIPTION OF PREFERRED EMBODIMENTS

Referring to FIG. 1, an optical connector device 100 according to an embodiment of the present invention includes a first connector 200 connected to a first optical fiber cable 400 and a second connector 300 connected to a second optical fiber cable 500. As can be seen from FIG. 1, the first connector 200 and the second connector 300 are matable with each other along the X-direction (mating direction).

Figure 2:
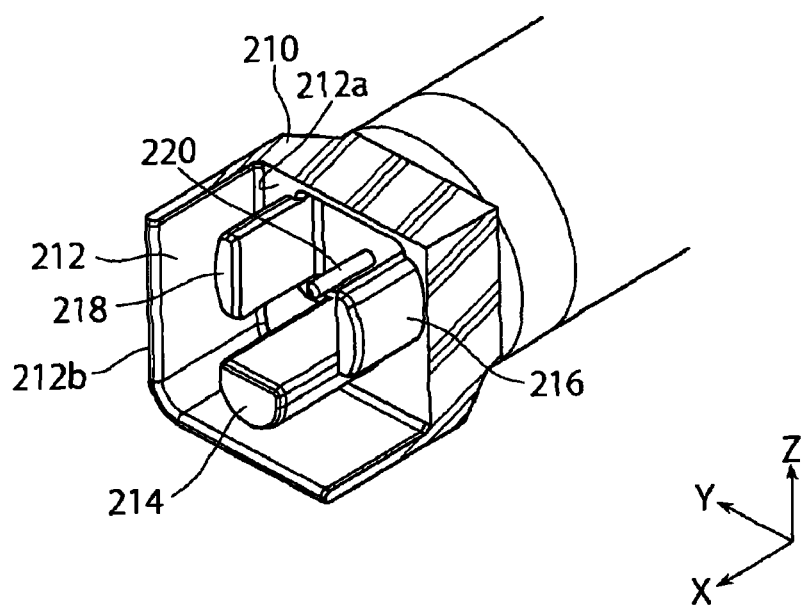
FIG. 2 is a perspective view of the first connector of FIG. 1, which shows part of the first connector in cross-section.
Figure 3:
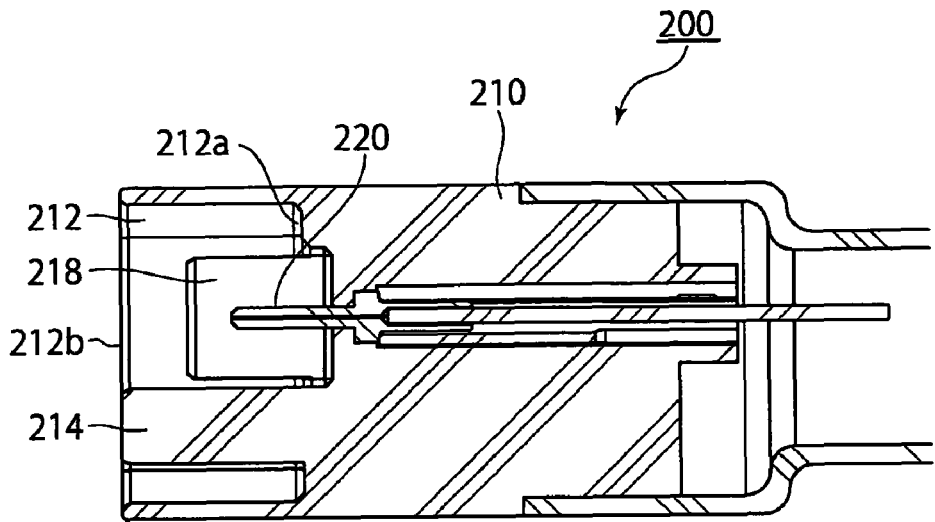
FIG. 3 is a cross-sectional view of the first connector taken along line III-III of FIG. 1.

Referring to FIGS. 2 and 3, the first connector 200 includes a first connector body 210 and a first ferrule 220 for holding an optical fiber of the first optical fiber cable 400. FIG. 3 is a cross-sectional view of the first connector 200 taken along the XZ-plane passing through the first ferrule 220. As is apparent from FIG. 3, the first ferrule 220 is held by the first connector body 210 such that the first ferrule 220 extends along the X-direction.

As shown in FIGS. 2 and 3, the first connector body 210 of this embodiment has an end portion made of an insulating material. The first connector body 210 includes an enclosure portion 212 provided so as to surround the first ferrule 220, a guide portion 214, and two positioners 216 and 218. Each of the guide portion 214 and the positioners 216 and 218 extends along the X-direction from a bottom 212a of the enclosure portion 212. The illustrated guide portion 214 is located below the first ferrule 220 (toward the negative Z-direction). The guide portion 214 projects toward an edge 212b of the enclosure portion 212 and has an end located closer to the edge 212b of the enclosure portion 212 than an end of the first ferrule 220 in the X-direction. The positioners 216 and 218 are provided so as to interpose the first ferrule 220 therebetween in the Y-direction. The positioners 216 and 218 of this embodiment are arranged symmetrically with respect to a plane passing through the center of the first connector 200 in the Y-direction (i.e., the XZ-plane passing through the first ferrule 220) and are located at positions that are deviated upward from the center of the first connector 200 in the Z-direction. Furthermore, each of the positioners 216 and 218 of this embodiment projects toward the edge 212b and has an end located closer to the edge 212b than the end of the first ferrule 220 in the X-direction. The ends of the positioners 216 and 218 are not located closer to the edge 212b than the end of the guide portion 214 in the X-direction. Specifically, the guide portion 214 projects longer than the positioners 216 and 218.

Figure 4:
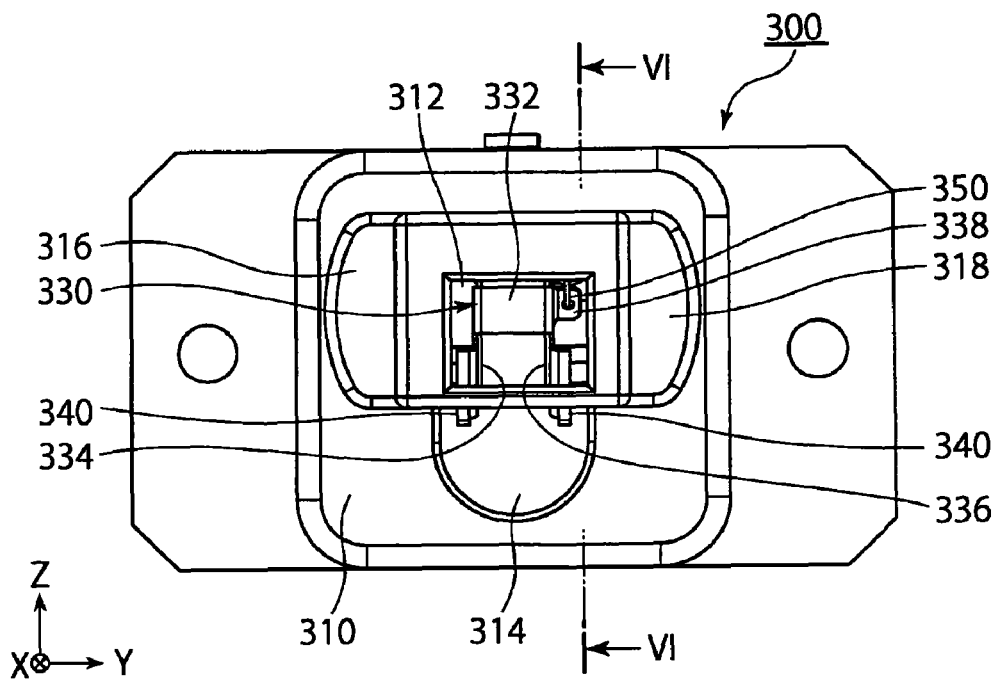
FIG. 4 is a front view showing the second connector of FIG. 1, in which a shutter of the second connector is located at a cover position.
Figure 6:
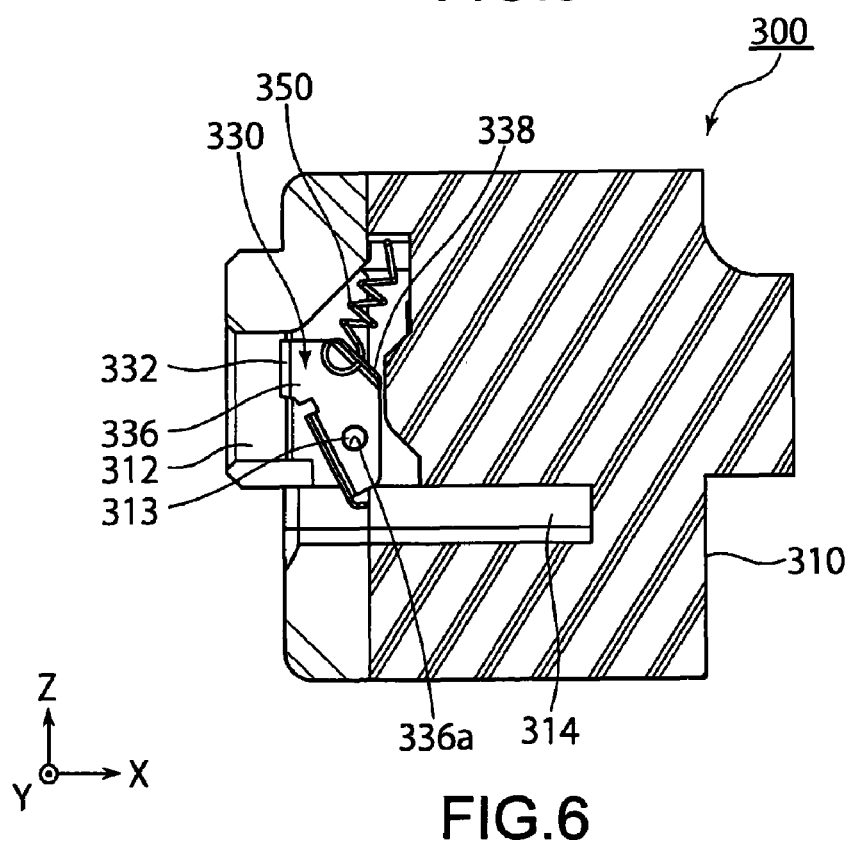
FIG. 6 is a cross-sectional view of the second connector taken along line VI-VI of FIG. 4.

Referring to FIGS. 4 and 6, the second connector 300 of this embodiment includes a second connector body 310, a second ferrule 320, a shutter 330 attached to the second connector body 310, and springs (biasing members) 350 attached to the second connector body 310 and the shutter 330.

Figure 5:
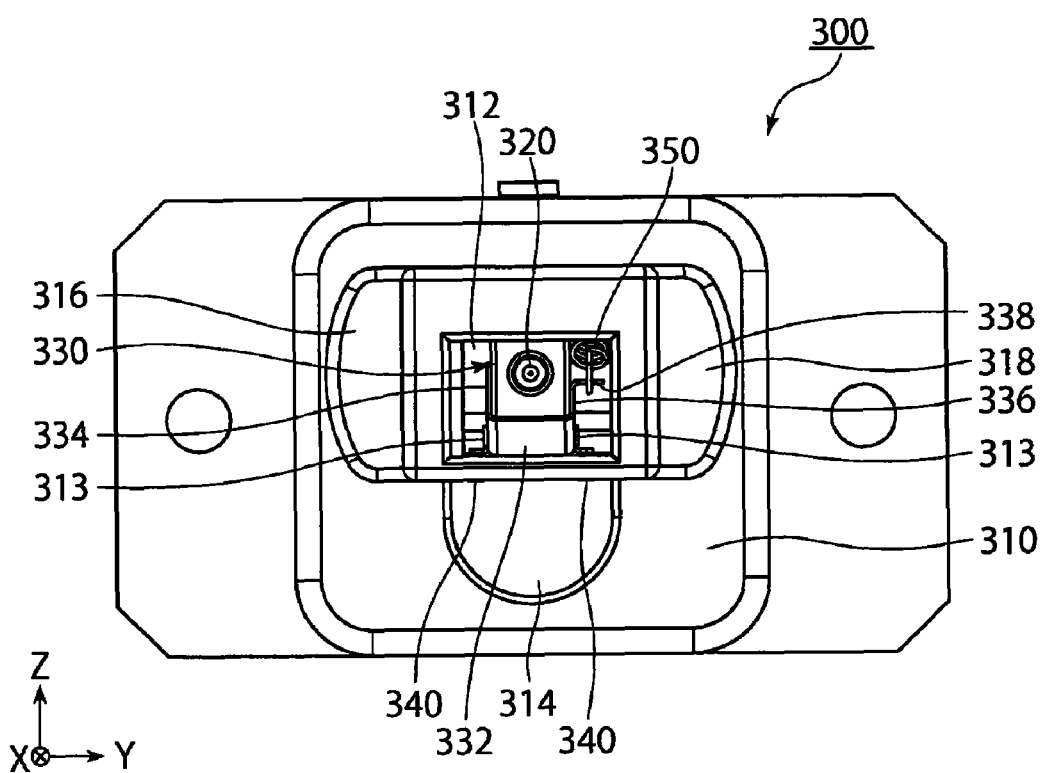
FIG. 5 is another front view showing the second connector of FIG. 4, in which the shutter is located at an open position.

As shown in FIG. 5, the second ferrule 320 is held by the second connector body 310 such that the second ferrule 320 extends along the X-direction. As can be seen from FIGS. 1 and 5, the second ferrule 320 is used to hold an optical fiber of the second optical fiber cable 500.

As shown in FIGS. 1, 4 to 6, and 9 to 11, the second connector body 310 has a receptacle 312 for receiving the first ferrule 220 of the first connector 200 along an optical axis $A_O$ of the optical fiber of the first optical fiber cable 400 (see FIG. 9), i.e., a center axis of the first ferrule 220, a shaft 313 for rotatably supporting the shutter 330, a receiver 314 for receiving the guide portion 214, and positioning holes 316 and 318 into which the positioners 216 and 218 are respectively inserted. As can be seen from FIGS. 4 and 5, each of the receiver 314 and the positioning holes 316 and 318 extends along the X-direction. Accordingly, the guide portion 214 and the positioners 216 and 218 are received into the receiver 314 and the positioning holes 316 and 318, respectively, along the X-direction. In the present embodiment, the receptacle 312 communicates with the receiver 314 as shown in FIG. 6.

Figure 7:
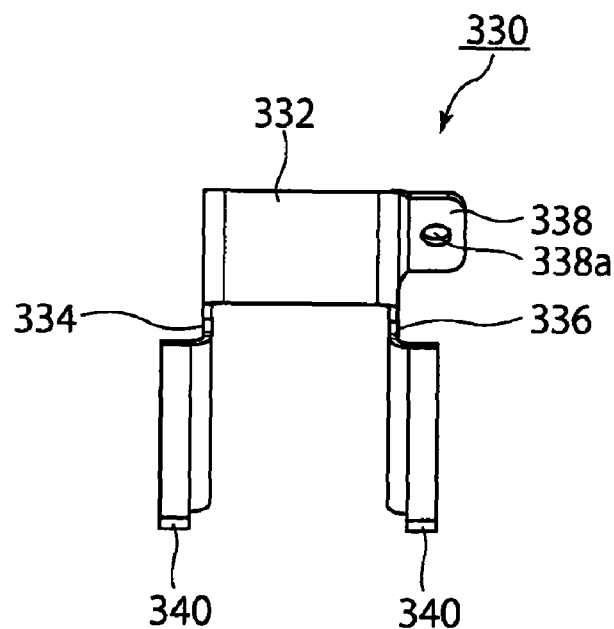
FIG. 7 is a front view showing the shutter of FIG. 4.
Figure 8:
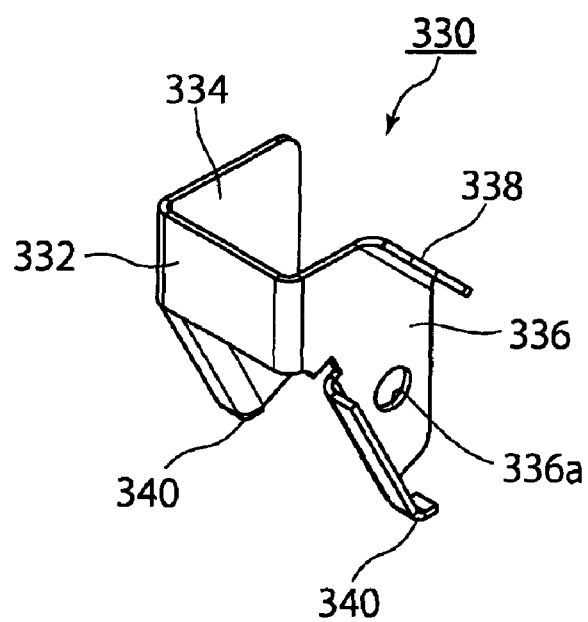
FIG. 8 is a perspective view showing the shutter of FIG. 7.

Referring to FIGS. 6 to 8, the shutter 330 includes a cover part 332 in the form of a plate, support parts 334 and 336 supported on the second connector body 310, a tab 338, and operation parts 340. The shutter 330 of this embodiment is made of metal and produced by bending the metal. For example, the shutter 330 may be produced by molding resin.

Each of the support parts 334 and 336 primarily has a flat surface perpendicular to the cover part 332. As shown in FIGS. 6 and 8, the support part 336 has a hole 336a defined therein. Similarly, the support part 334 has a hole 336a defined therein, which is not shown in the drawings. The shaft 313 of the second connector body 310 is pressed in those holes 336a, so that the support parts 334 and 336 are rotatably supported by the second connector body 310 (see FIGS. 5 and 6). As can be seen from FIG. 9, the shaft 313, i.e., the rotation axis of the support parts 334 and 336 is perpendicular to the optical axis $A_O$. The support parts 334 and 336 may be formed in such an oblique manner that they are spread or constricted from the cover part 332 toward the holes 336a and 336a. Furthermore, the support part 334 of the two support parts 334 and 336 may be eliminated.

Figure 9:
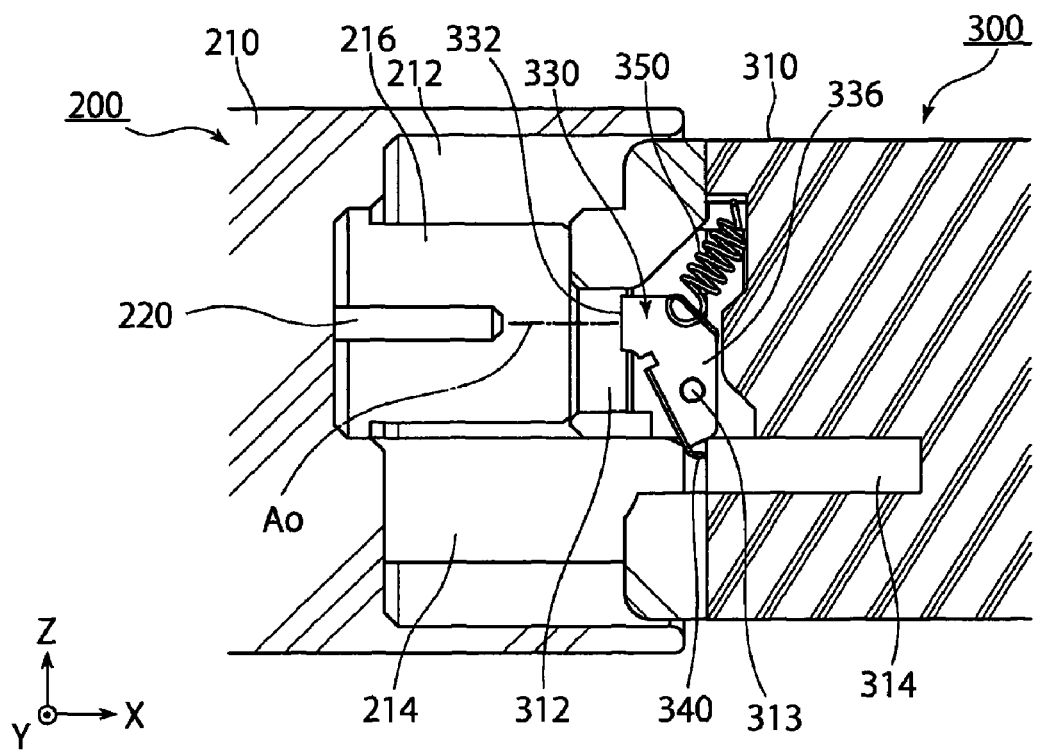
FIG. 9 is a cross-sectional view showing the optical connector device of FIG. 1, in which the shutter is located at the cover position while the first connector and the second connector are not mated with each other.

As shown in FIGS. 7 and 8, the tab 338 primarily has a flat surface that is oblique to the cover part 332 but is perpendicular to the support part 336. The tab 338 is provided at an upper portion of the support part 336. In the present embodiment, the tab 338 is only provided on the support part 336. However, the tab 338 may be provided on the support part 334. As shown in FIG. 7, the tab 338 has a hole 338a defined therein. As can be seen from FIG. 6, each of the springs 350 has one end attached to the second connector body 310 and another end attached to the hole 338a. Thus, when the shutter 330 is under normal conditions, the cover part 332 is in parallel to the YZ-plane as shown in FIG. 6. At that time, the optical axis $A_O$ intersects the cover part 332 as shown in FIG. 9. This position of the shutter 330 is hereinafter referred to as a cover position. Specifically, the springs 350 of this embodiment serve as biasing members for continuously biasing the shutter 330 toward the cover position.

Figure 10:
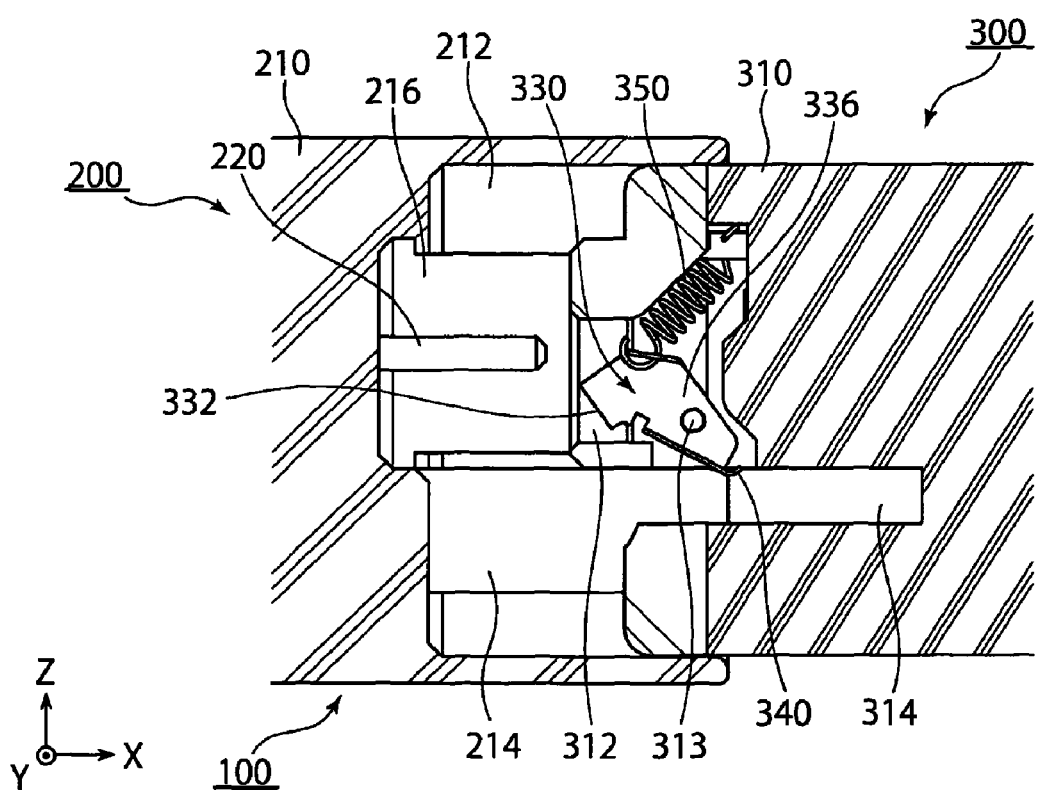
FIG. 10 is another cross-sectional view showing the optical connector device of FIG. 1, in which the shutter is being moved from the cover position to the open position while the first connector and the second connector are not mated with each other.
Figure 11:
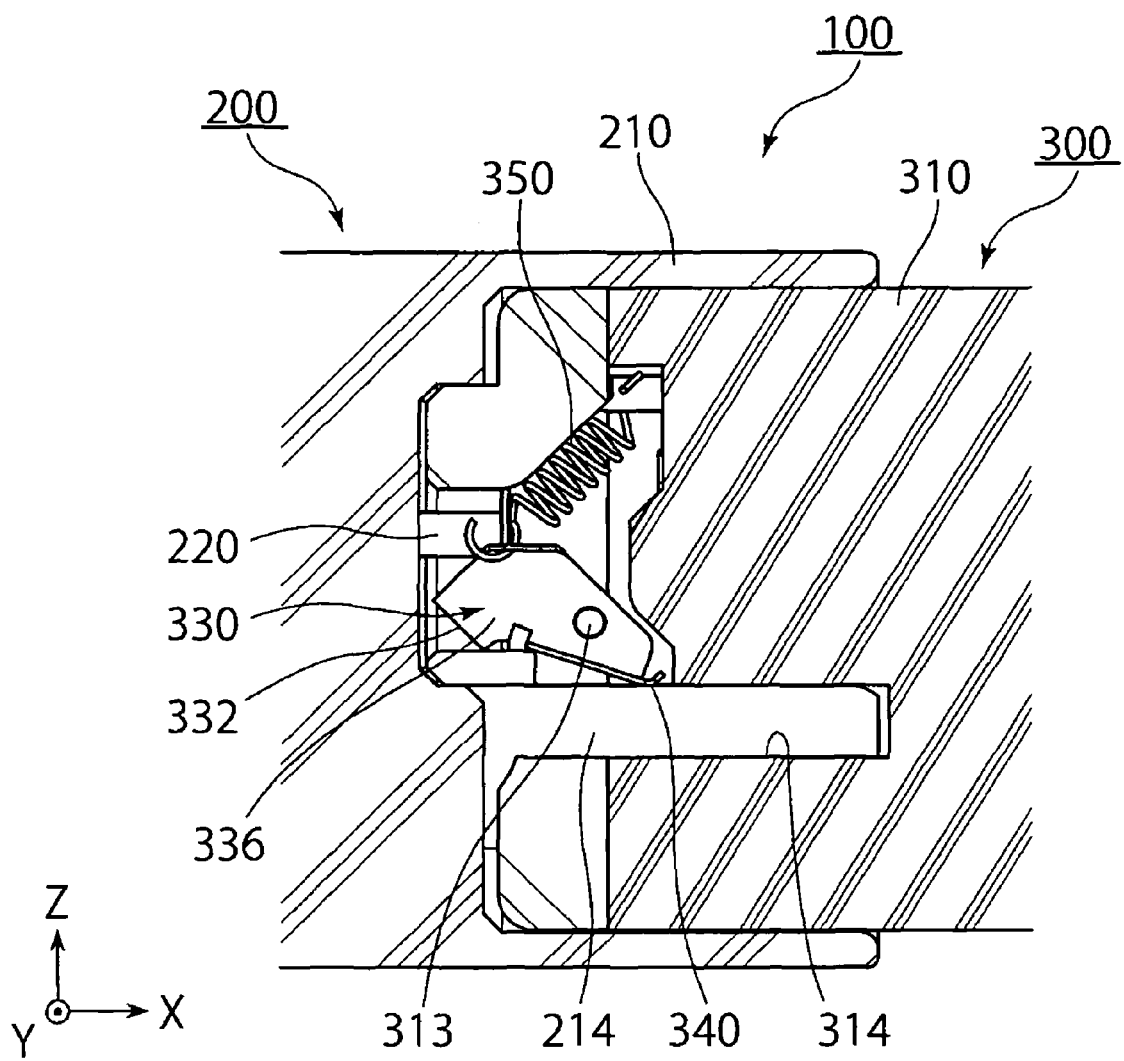
FIG. 11 is another cross-sectional view showing the optical connector device of FIG. 1, in which the shutter is located at the open position while the first connector and the second connector have been mated with each other.

As shown in FIGS. 4 and 6 to 8, the operation parts 340 are respectively provided at lower portions of the support parts 334 and 336. As best illustrated in FIGS. 4 and 6, when the shutter 330 is located at the cover position, the operation parts 340 are located on a receiving path of the guide portion 214, through which the guide portion 214 passes to the receiver 314 when the guide portion 214 is received into the receiver 314. Therefore, when the guide portion 214 is received into the receiver 314, the operation parts 340 are pressed along the X-direction by the guide portion 214. The operation parts 340 of this embodiment are formed by curved surfaces as viewed from the front of the second connector 300. Accordingly, the support parts 334 and 336 can smoothly be rotated about the shaft 313 by the pressing of the guide portion 214 while they are slid on the guide portion 214 being inserted into the receiver 314. As shown in FIGS. 10 and 11, the operation parts 340 allow the shutter 330 to rotate against the biasing force of the springs 350 so that the cover part 332 moves downward toward the front of the second connector body 310 when the guide portion 214 is received into the receiver 314. As shown in FIG. 11, when the operation parts 340 are pushed up onto the guide portion 214 by the guide portion 214, the cover part 332 is moved to a position at which the optical axis $A_O$ does not intersect the cover part 332. The position of the shutter 330 at that time is hereinafter referred to as an open position.

Operation of the optical connector device 100 thus constructed will be described below. First, as shown in FIG. 9, when the first connector 200 and the second connector 300 are not mated with each other in a state in which the guide portion 214 does not press the operation parts 340 in the X-direction, the shutter 330 is located at the cover position. Then, from the relationship of the length between the guide portion 214 and the positioners 216 and 218 and the first ferrule 220, the guide portion 214 is received into the receiver 314. Next, the positioners 216 and 218 are inserted into the positioning holes 316 and 318, respectively. Thus, the axes of the optical fiber held in the first ferrule 220 and the optical fiber held in the second ferrule 320 are aligned with each other on the optical axis $A_O$ (alignment). Here, when the guide portion 214 is received into the receiver 314, the guide portion 214 pushes the operation parts 340 in the X-direction. Accordingly, the shutter 330 starts to rotate toward the open position as shown in FIG. 10. When the guide portion 214 is further pushed and received into the receiver 314, the operation parts 340 are slid relatively on the guide portion 214. As a result, the shutter 330 is moved to the open position as shown in FIG. 11. At that time, the cover part 332 of the shutter 330 is not located on the optical axis $A_O$. Thus, within the receptacle 312, the optical fiber held in the first ferrule 220 is optically coupled to the optical fiber held in the second ferrule 320.

As described above, the shutter 330 of this embodiment is located at the cover position under normal conditions. When the guide portion 214 is received into the receiver 314, the shutter 330 is moved from the cover position to the open position by the guide portion 214. In other words, it is the guide portion 214 that serves as a key for opening and closing the shutter 330. Thus, part of the housing of the first connector 200 that is not provided near the first ferrule 210 serves as a key for opening and closing the shutter 330. Accordingly, an end surface of the first ferrule 210 can be prevented from mistakenly being brought into contact with the shutter 330 as in the prior art.

Furthermore, in the embodiment of the present invention, the cover part 332, the tab 338, and the operation parts 340 are provided at vertexes of virtual triangles. The rotation axis of the shutter 330 (i.e., the holes 336a and the shaft 313) is located between the cover part 332 and the operation parts 340 and between the tab 338 and the operation parts 340. Therefore, as is apparent from FIG. 11, when the shutter 330 is located at the open position, the shaft 313 is located between the cover part 332 and contact portions of the operation parts 340 with the guide portion 214 in the X-direction. As shown in FIG. 9, when the shutter 330 is located at the cover position, the shaft 313 is located between the tab 338 and the operation parts 340 in the Z-direction. With this configuration, it is possible to reduce a space required for movement of the cover part 332 (a margin required to avoid collision of the cover part 332 with other parts).

In the above embodiment, each of the illustrated first connector 200 and second connector 300 has an end portion (mating portion) in the form of a rectangular column. The present invention is not limited to this example. For example, the first connector 200 and the second connector 300 may have an end portion having a cylindrical shape. Furthermore, the springs 350 are used as the biasing members in this embodiment. However, other means may be used as long as they can bias the shutter 330 toward the cover position. For example, a weight may be attached directly or indirectly to the shutter 330 so as to bias the shutter 330 toward the cover position.

According to the present invention, a guide portion that projects longer than a ferrule is used to open a shutter when it is received into a second connector. Therefore, an end surface of the ferrule can be prevented from mistakenly being brought into contact with the shutter.

Furthermore, it is possible to reduce a space required for movement of the cover part of the shutter with the following configuration: The guide portion is received into a receiver along a mating direction. A rotation axis is provided so that it is interposed between the cover part and a contact portion of an operation part with the guide portion in the mating direction when the shutter is opened.

The present application is based on a Japanese patent application of JP2009-133530 filed before the Japan Patent Office on Jun. 2, 2009, the contents of which are incorporated herein by reference.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

What is claimed is:

1. An optical connector device comprising a first connector and a second connector, wherein:
   the first connector includes a ferrule for holding an optical fiber, and a guide portion projecting longer than the ferrule;
   the second connector is for receiving an end of the ferrule along an optical axis of the optical fiber and includes a receiver for receiving the guide portion, and a shutter having a cover part, the shutter being movable between a cover position at which the optical axis intersects the cover part and an open position at which the optical axis does not intersect the cover part;
   the guide portion is operable to move the shutter from the cover position to the open position when the guide portion is received into the receiver along a mating direction in parallel with the optical axis;
   the second connector further includes a second connector body;
   the shutter is supported on the second connector body so as to be rotatable about a rotation axis, the rotation axis being perpendicular to the optical axis;
   the shutter includes an operation part;
   the guide portion passes through a receiving path when the guide portion is received into the receiver;
   the operation part is located on the receiving path in a state in which the shutter is located at the cover position;
   the shutter is rotated from the cover position to the open position when the operation part is pressed by the guide portion being received into the receiver; and
   when the shutter is located at the cover position, the cover part is apart from the rotation axis and the operation part so as to be located nearer to a mating end of the second connector in the mating direction than the rotation axis and the operation part, and the rotation axis is located between the cover part and the operation part in a direction perpendicular to the mating direction and the rotation axis.

2. The optical connector device as recited in claim 1, wherein
   the rotation axis is located between the cover part and a contact portion of the operation part with the guide portion in the mating direction when the shutter is located at the open position.

3. The optical connector device as recited in claim 1, wherein the shutter is integrally formed with a support part in addition to the cover part and the operation part,
   the support part primarily has a flat surface that intersects the cover part,
   the support part is rotatably supported on the second connector body, and
   the operation part is provided at an end of the support part.

4. The optical connector device as recited in claim 1, wherein the first connector further includes a positioner projecting longer than the ferrule, and
   the guide portion projects longer than the positioner.

5. The optical connector device as recited in claim 1, wherein the second connector further includes a biasing member for biasing the shutter toward the cover position.

* * * * *